United States Patent
Cocchi et al.

(10) Patent No.: US 11,571,009 B2
(45) Date of Patent: Feb. 7, 2023

(54) MACHINE AND METHOD FOR THERMALLY TREATING LIQUID OR SEMI-LIQUID FOOD PRODUCTS

(71) Applicant: ALI GROUP S.R.L.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul (IT)

(*) Notice: Subject to any disclaimer, the term of this patent is extended or adjusted under 35 U.S.C. 154(b) by 226 days.

(21) Appl. No.: 16/835,888

(22) Filed: Mar. 31, 2020

(65) Prior Publication Data

US 2020/0315218 A1 Oct. 8, 2020

(30) Foreign Application Priority Data

Apr. 2, 2019 (IT) .......................... 102019000004952

(51) Int. Cl.
*A23G 9/16* (2006.01)
*A23L 3/22* (2006.01)
(Continued)

(52) U.S. Cl.
CPC ................ *A23L 3/22* (2013.01); *A23G 9/166* (2013.01); *A23G 9/224* (2013.01); *A23G 9/305* (2013.01);
(Continued)

(58) Field of Classification Search
CPC . A23G 9/305; A23G 9/22; A23G 9/30; A23G 9/224; A23G 9/166; A23L 3/22;
(Continued)

(56) References Cited

U.S. PATENT DOCUMENTS 2,972,239 A * 2/1961 Vasby ...................... A23G 9/20
 62/342
3,641,783 A * 2/1972 Werner .................. A23G 9/224
 62/343
(Continued)

FOREIGN PATENT DOCUMENTS

EP 2505070 A1 10/2012
EP 2805619 A1 11/2014
(Continued)

OTHER PUBLICATIONS

Italian Search Report dated Nov. 8, 2019 for counterpart Italian Application No. IT201900004952.

*Primary Examiner* — Drew E Becker
(74) *Attorney, Agent, or Firm* — Shuttleworth & Ingersoll, PLC; Timothy J. Klima

(57) ABSTRACT

A machine for pasteurizing liquid or semi-liquid food products, including: a first container for the thermal treatment of a liquid or semi-liquid base product; a second container for feeding the liquid or semi-liquid base product, connected to the first, thermal treatment container, for feeding the liquid or semi-liquid base product; a stirrer for mixing the product in the first, processing container and mounted inside the first, thermal treatment container; a thermal system including an exchanger associated with the walls of the first, processing container and configured to release heat at the walls of the first, thermal treatment container, the machine wherein the stirrer is externally helically shaped and extends between a first, inlet end and a second, outlet end, so that as it rotates, the liquid or semi-liquid product is made to advance between the first, inlet end and the second, outlet end.

9 Claims, 4 Drawing Sheets

(51) Int. Cl.
  *A23G 9/30* (2006.01)
  *A23L 3/00* (2006.01)
  *A23L 3/18* (2006.01)
  *A23G 9/22* (2006.01)

(52) U.S. Cl.
  CPC .............. *A23L 3/001* (2013.01); *A23L 3/18* (2013.01); *A23V 2002/00* (2013.01)

(58) Field of Classification Search
  CPC . A23L 3/001; A23L 3/18; A23L 3/003; A23V 2002/00; A23V 2300/20; A23V 2300/24; A21D 15/04; A23C 3/03–3/0337
  See application file for complete search history.

(56) References Cited

U.S. PATENT DOCUMENTS

| | | | | |
|---|---|---|---|---|
| 3,811,494 A * | 5/1974 | Menzel | ............... | A23G 9/04 165/65 |
| 3,930,535 A * | 1/1976 | Menzel | ............... | A23G 9/20 165/254 |
| 4,476,146 A * | 10/1984 | Manfroni | ............... | A23G 9/08 426/522 |
| 4,522,041 A * | 6/1985 | Menzel | ............... | A23G 9/04 165/122 |
| 5,018,363 A * | 5/1991 | Aoki | ............... | A23G 9/228 366/177.1 |
| 5,199,278 A * | 4/1993 | Cocchi | ............... | A23G 9/086 366/149 |
| 6,494,055 B1 * | 12/2002 | Meserole | ............... | A23G 9/045 366/305 |
| 9,693,571 B2 * | 7/2017 | Cocchi | ............... | A23G 9/16 |
| 10,772,341 B2 * | 9/2020 | Cocchi | ............... | A23G 9/163 |
| 2002/0108964 A1 * | 8/2002 | Staten | ............... | A23G 9/163 222/61 |
| 2007/0151101 A1 * | 7/2007 | Cocchi | ............... | A23G 9/22 29/890.03 |
| 2008/0226779 A1 * | 9/2008 | Cocchi | ............... | A23G 9/30 426/231 |
| 2010/0139500 A1 * | 6/2010 | Bravo | ............... | A23G 9/305 99/455 |
| 2011/0036247 A1 * | 2/2011 | Bravo | ............... | A23G 9/305 99/455 |
| 2011/0088869 A1 * | 4/2011 | Wadle | ............... | A23G 9/22 165/64 |
| 2015/0096322 A1 * | 4/2015 | Cocchi | ............... | F25B 30/02 62/238.7 |
| 2015/0306640 A1 * | 10/2015 | Lazzarini | ............... | B08B 9/08 134/18 |
| 2016/0113305 A1 * | 4/2016 | Cocchi | ............... | A23G 9/28 426/231 |
| 2017/0332659 A1 * | 11/2017 | Cocchi | ............... | A23G 9/12 |
| 2018/0000114 A1 * | 1/2018 | Grampassi | ............... | A23G 9/30 |
| 2018/0153188 A1 * | 6/2018 | Cocchi | ............... | A23G 9/163 |
| 2020/0128851 A1 * | 4/2020 | Ampezzan | ............... | A23G 9/305 |

FOREIGN PATENT DOCUMENTS

| | | |
|---|---|---|
| EP | 2856888 A1 | 4/2015 |
| EP | 2936993 A1 | 10/2015 |
| EP | 3095332 A1 | 11/2016 |
| EP | 3172970 A1 | 5/2017 |
| EP | 3381295 A1 | 10/2018 |
| EP | 3384781 A1 | 10/2018 |
| GB | 2530465 A | 3/2016 |
| WO | 2009129918 A2 | 10/2009 |
| WO | 2014188351 A1 | 11/2014 |

* cited by examiner

MACHINE AND METHOD FOR THERMALLY TREATING LIQUID OR SEMI-LIQUID FOOD PRODUCTS

This application claims priority to Italian Patent Application 102019000004952 filed Apr. 2, 2019, the entirety of which is incorporated by reference herein.

BACKGROUND OF THE INVENTION

This invention relates to a machine and a method for thermally treating liquid or semi-liquid food products.

In the context of processing of liquid or semi-liquid food products, a need that users feel particularly strongly is that to be able to thermally treat the liquid or semi-liquid food products, specifically to subject them to a preventive pasteurization (heating) treatment in a particularly simple and efficient manner.

One drawback of certain kinds of existing pasteurizing machines is connected to the fact that it is particularly difficult to uniformly regulate the temperature of the product being processed: in many cases, this leads to localized burning or overheating of the product, particularly in the zones near the heated walls of the container, which may significantly modify the quality and organoleptic properties of the product being processed.

SUMMARY OF THE INVENTION

This invention therefore has for an aim to meet the above-mentioned need, in particular that of making available a machine and a method which, thanks to its features, allows the products being processed to be thermally treated in a particularly simple and efficient manner.

A further aim of this invention is therefore to provide a machine and a method which, thanks to its features, allows the product being processed to be heated uniformly and prevents localized heating of the product.

BRIEF DESCRIPTION OF THE DRAWINGS

The technical features of the disclosure, with reference to the above aims, are clearly described in the annexed claims and its advantages are more apparent from the detailed description which follows, with reference to the accompanying drawings which illustrate an example, non-limiting embodiment and in which:

DESCRIPTION OF THE PREFERRED EMBODIMENTS

Figure 1:
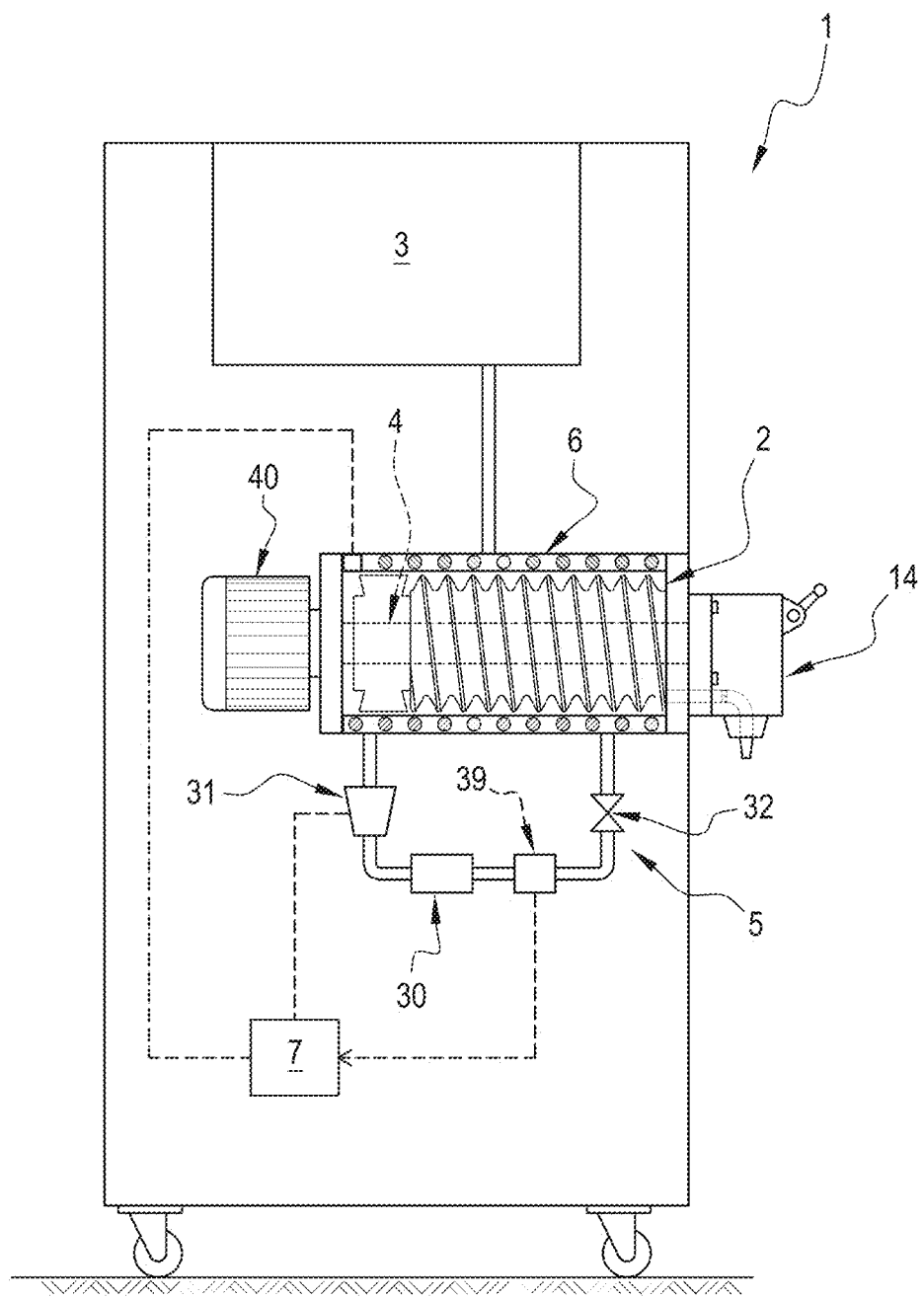
FIG. 1 is a schematic view of a first embodiment of a machine according to this invention.

With reference to the accompanying drawings, the numeral 1 denotes a machine of the invention for thermally treating (more specifically, pasteurizing) liquid or semi-liquid food products.

The machine 1 is adapted to thermally treat ice cream products (artisan gelato or soft ice cream) or patisserie products or soups and the like.

The machine 1 for pasteurizing liquid or semi-liquid food products comprises:
- a first container 2 for the thermal treatment of a liquid or semi-liquid base product;
- a second container 3 for feeding the liquid or semi-liquid base product, connected to the first, thermal treatment container 2, for feeding the liquid or semi-liquid base product;
- a stirrer 4 for mixing the product in the first, processing container 2 and mounted inside the first, thermal treatment container 2;
- a thermal system 5 comprising a heat exchanger 6, associated with the walls of the first processing container 2 to release heat to the first thermal treatment container 2.

According to another aspect, the stirrer 4 is externally helically shaped and extends between a first, inlet end 35 and a second, outlet end 36, so that as it rotates, the liquid or semi-liquid product is made to advance between the first, inlet end 35 and the second, outlet end 36.

As illustrated in the accompanying drawings, the machine 1 comprises a drive unit 40 connected to the stirrer 4, for driving it in rotation.

Preferably, the drive unit 40 is connected to a processing and control unit 7.

According to another aspect, the thermal system 5 comprises a heat exchanger 6 associated with the first processing container 2 (mentioned above), a further heat exchanger 30, a compressor 31, and a pressure reducing unit 32.

It should be noticed that the heat exchanger 6, the further heat exchanger 30, the compressor 31, and the pressure reducing unit 32 define a circuit containing a heat exchanger fluid.

In other words, the thermal system 5 is a thermodynamic system (configured to operate according to a thermodynamic cycle using a heat exchanger fluid).

According to another aspect, the thermal system 5 may comprise a sensor 39 adapted to detect the pressure or temperature of the heat exchanger fluid at a point in the circuit.

According to yet another aspect, the machine 1 comprises a dispenser 14, which is connected to the first processing container 2 for processing a liquid or semi-liquid base product, and which allows the product to be extracted from the container 2.

The heat exchanger 6 defines a condenser of the thermodynamic circuit.

It should be noted that other configurations of the thermal system 6 are also imaginable.

For example, the thermal system 5 might be of the hot gas type, where the gas is recirculated only between the compressor and the exchanger 6, transferring heat to the exchanger 6.

According to yet another aspect, the machine 1 is provided with an exchanger which is adapted to cool the product inside the first processing container 2.

It should be noted that the exchanger might be the heat exchanger 6 mentioned above (or a different exchanger): in this case, the thermal system 5 is preferably switchable between two configurations: a first configuration in which the exchanger 6 heats and a second configuration in which the exchanger 6 cools.

A thermal system 5 adapted to be switched between two configurations, so that the heat exchanger 6 can be used for heating or cooling, is described in patent document EP2856888A1 which is incorporated herein by reference (in particular, the systems of FIGS. 2, 4, 5 and 6).

Advantageously, according to this aspect, the first, processing container 2 can be heated or cooled.

It should be noted that according to this aspect, the machine 1 is preferably provided with user-activable means (controls) for selecting the configuration to set the exchanger 6 of the thermal system 5 to the cooling or heating configuration.

Thus, advantageously, the machine 1 can perform cooling or heating cycles on the product, depending on specific processing requirements.

The dispenser 14 preferably comprises a user-activable lever for allowing liquid or semi-liquid base product to be dispensed.

According to another aspect, the second, feed container 3 is an open-top tub.

According to another aspect, the second, feed container 3 for feeding the liquid or semi-liquid base product is a cylinder.

According to yet another aspect, the machine 1 comprises a drive and control unit 7 connected to the thermal system 5 and configured to control the thermal system 5 in order to heat the walls of the first, processing container 2 to a temperature between 50° C. and 85° C. (preferably to a temperature between 60° C. and 85° C. and, still more preferably to a temperature between 60° C. and 75° C.).

According to another aspect, the stirrer 4 comprises a first portion 4A which is externally helically shaped and a second portion 4B which has at least one radial blade 43.

Figure 3:
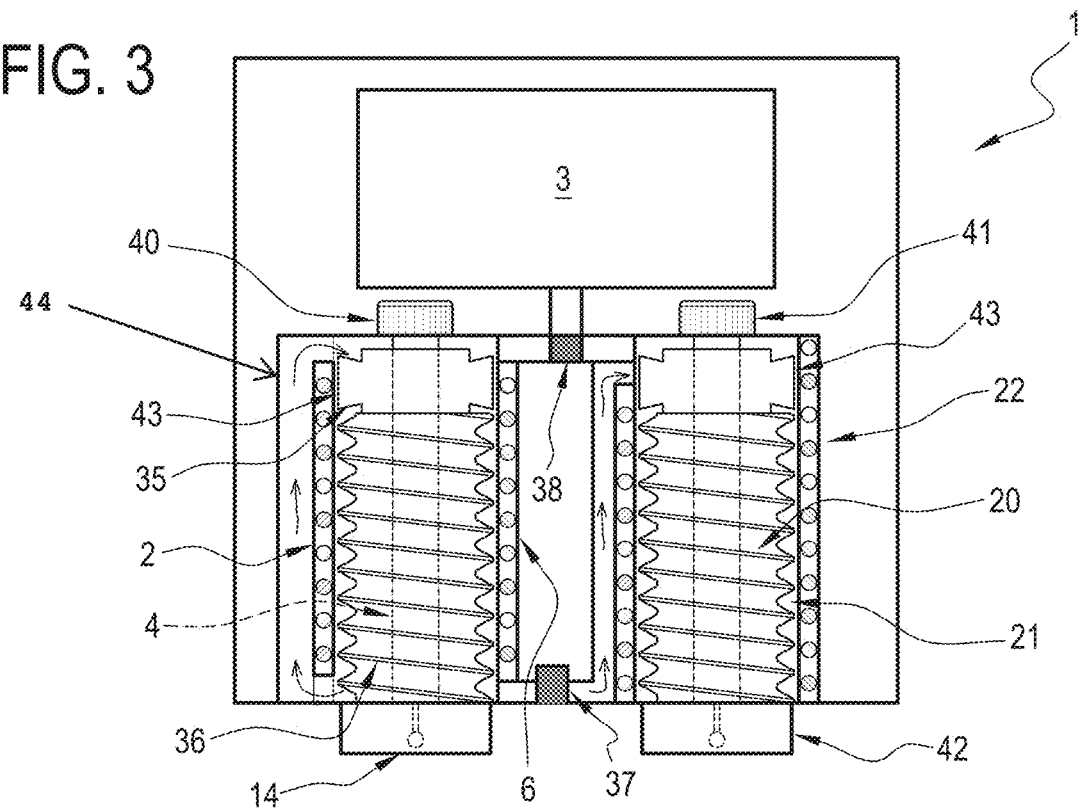
FIG. 3 is a schematic view of a third embodiment of a machine according to this invention.
Figure 4:
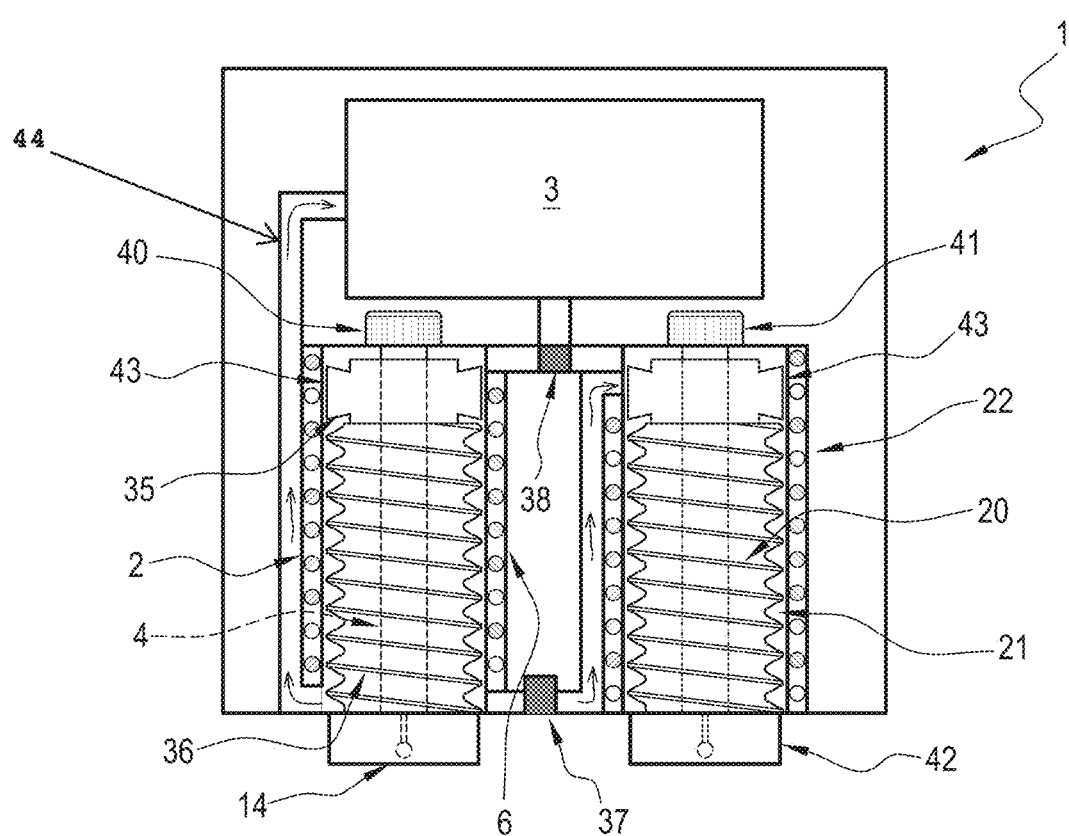
FIG. 4 is a schematic view of a fourth embodiment of a machine according to this invention
Figure 5:
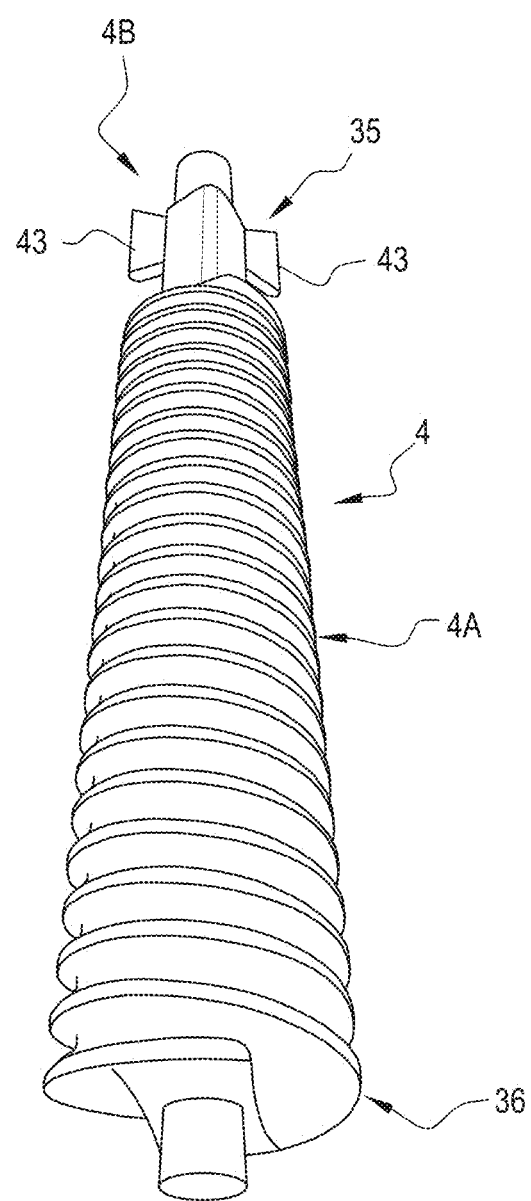
FIG. 5 is a schematic view of a detail of the machine of the invention as illustrated in the preceding figures.

It should be noted that the stirrer is illustrated schematically in FIGS. 1-4: the stirrer 4 is shown in more detail in FIG. 5.

It should be noted that, in conjunction with the inside wall of the first container 2, the portion 4A which is externally helically shaped defines a chamber along which the product is made to advance by effect of the rotation of the stirrer 4 (and in which the product is subjected to a thermal treatment, preferably heating).

The second portion 4B is disposed at the first, inlet end 35 and the first portion 4A is disposed at the second, outlet end 36.

The main function of the second portion 4B is that of stirring the product.

The first portion 4A, on the other hand, thanks to its structure, has the function of pushing the product along the direction of extension of the first container 2.

Figure 2:
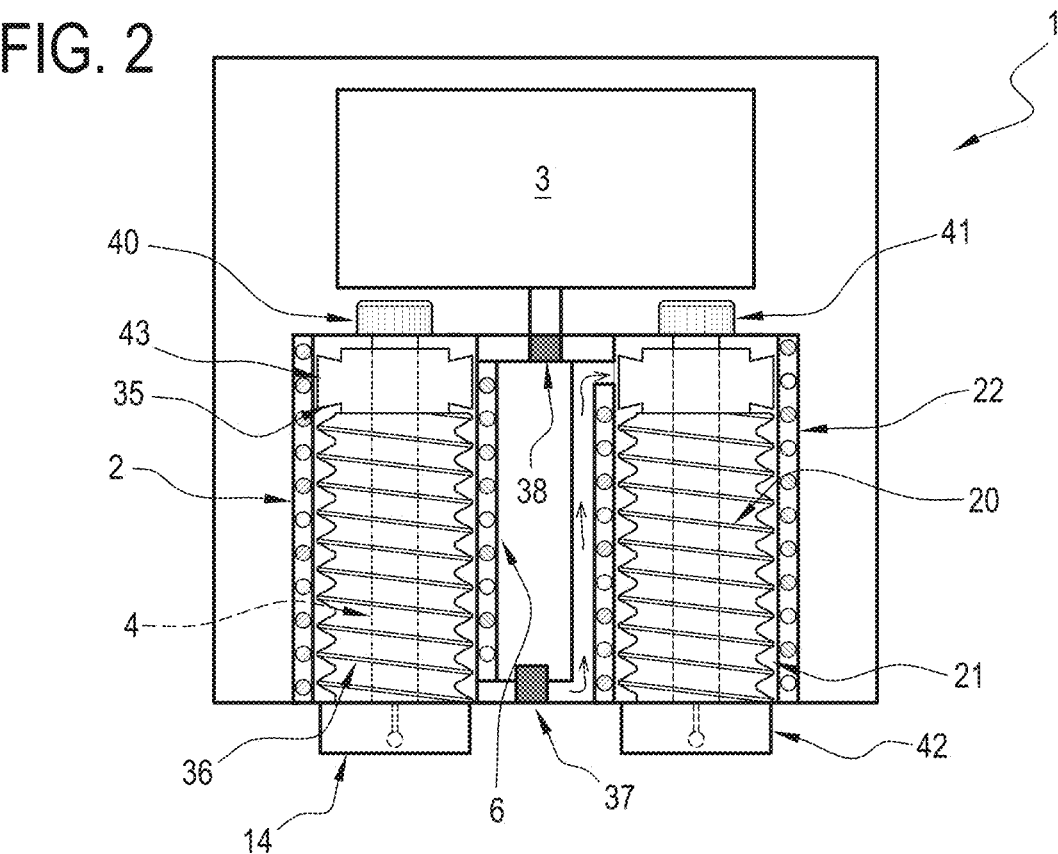
FIG. 2 is a schematic view of a second embodiment of a machine according to this invention.

According to a further embodiment, illustrated schematically in FIG. 2, the machine 1 comprises:
  a third container 20 for the thermal treatment of a liquid or semi-liquid base product;
  a second exchanger 22 associated with the walls of the third, processing container 20 for the thermal treatment of the liquid or semi-liquid base product inside the third, thermal treatment container 20;
  and a second stirrer 21 to mix the product in the third, processing container 20, mounted inside the third, thermal treatment container 20, the second stirrer 21 being externally helically shaped and extending between a first, inlet end and a second, outlet end, so that as it rotates, the liquid or semi-liquid product is made to advance between the first, inlet end 35 and the second, outlet end 36.

The second stirrer 21 has the same features as those described with reference to the stirrer 4.

According to another aspect, the second exchanger 22 associated with the walls of the third, processing container 20 is configured to cool the base product inside the third, processing container 20.

Thus, the third, processing container 20 cools the product.

Preferably, the third, processing container 20 is a cylinder.

According to another aspect, the first container 2 is connected to the third container 20 so that the thermally treated product coming out of the first container 2 is conveyed directly to the third container 20.

According to this aspect, the machine 1 preferably comprises a pump 37 (illustrated schematically in FIG. 2) to convey the product from the first container 2 to the third container 20.

According to yet another aspect, the second, feed container 3 is connectable to the first, thermal treatment container 2 and to the third, thermal treatment container 20.

Preferably, the machine 1 comprises a valve assembly 38 configured to allow placing the second, feed container 3 in fluid communication (to feed product) with the first, thermal treatment container 2 and/or with the third, thermal treatment container 20.

According to an aspect, the valve assembly 38 may comprise a pump, which can be enabled and disabled to convey product from the second, feed container 3 to the first, thermal treatment container 2 and/or to the third, thermal treatment container 20.

As illustrated in the embodiment of FIG. 2, the machine 1 comprises a drive unit 41, connected to the stirrer 21 to drive it in rotation.

Preferably, the drive unit 41 is connected to the processing and control unit 7.

According to another aspect, the machine illustrated in FIG. 2 comprises a second dispenser 42, adapted to allow dispensing the liquid or semi-liquid product from the third container 20.

FIG. 3 illustrates an embodiment provided with a recirculation duct 44 between the inlet end 35 and the outlet end 36 of the container 2.

It may be observed that the product advancing by the effect of the rotation of the stirrer 4 can thus be returned to the inlet of the container 2: that way, heating can be performed more progressively because the product traverses the container 2 several times.

FIG. 4 illustrates an embodiment provided with a recirculation duct 44 between the outlet end 36 and the container 3.

It may be observed that the product advancing by the effect of the rotation of the stirrer 4 can thus be returned to the inlet of the container 3: that way, heating can be performed more progressively because the product traverses the container 2 several times.

It should be noted that according to another aspect, the exchanger 6 associated with the walls of the first processing container 2 and configured to release heat to the first thermal treatment container 2 may also cool the first container 2 (as described above).

According to this aspect, the drive and control unit 7 is configured to control switching of the thermal system between the configuration for heating and the configuration for cooling the container 2.

According to another aspect, the thermal system comprises a second exchanger (not illustrated and different from the exchanger 6) adapted to cool the first processing container 2.

It should be noted that with reference to the machines 1 illustrated in FIGS. 2, 3 and 4, the machine 1 might also be provided with an exchanger adapted to cool the product in the third, processing container 20.

It should be noted that the exchanger might be the aforementioned heat exchanger 22: in this case, the thermal system 5 is preferably switchable between two configurations: a first configuration in which the exchanger 22 heats and a second configuration in which the exchanger 22 cools.

A thermal system 5 adapted to be switched between two configurations, so that the heat exchanger 22 can be used for heating or cooling, is described in patent document EP2856888A1 which is incorporated herein by reference (in particular, the systems of FIGS. 2, 4, 5 and 6).

Advantageously, according to this aspect, the third, processing container 20 can be heated or cooled.

It should be noted that according to this aspect, the machine 1 is preferably provided with user-activable means (controls) for selecting the configuration to set the exchanger 22 of the thermal system 5 to the cooling or heating configuration.

Thus, advantageously, the machine 1 can perform cooling or heating cycles on the product, depending on specific processing requirements.

Also defined according to the invention is a method for pasteurizing (heating) liquid or semi-liquid food products in a machine according to any of the aspects described above, comprising the following steps:

continuously feeding the liquid or semi-liquid base product from the second, feeding container 3 to the first, thermal treatment container 2;

pasteurizing the liquid or semi-liquid base product through the steps of heating the walls of the first, processing container 2 to a temperature between 50° and 85° C. and simultaneously making the stirrer 4 rotate in such a way as to cause the liquid or semi-liquid product to advance practically continuously from the inlet end 35 to the outlet end 36 of the stirrer 4.

According to an aspect, the method comprises a step of causing the product to flow out of the outlet end 36 of the stirrer 4.

According to yet another aspect, the step of heating the walls of the first, processing container 2 to a temperature between 50° and 85° C. comprises a step of heating the walls of the first, processing container 2 to a temperature between 60° and 85° C. (preferably between 60° and 75° C.).

It should be noted that one advantage of this invention is that the product subjected to pasteurization is moved substantially continuously inside the first container 2, which means that the product is heated uniformly and progressively.

Furthermore, the degree of heating—that is, the final temperature reached—may be controlled in a particularly simple manner by varying the rotation speed of the stirrer 4: in effect, the slower the rotation speed of the stirrer 4, the longer the time the product is subjected to heating. It is thus possible (at least within a certain interval) to vary the pasteurization temperature—that is, the final temperature reached by the product—by simply adjusting the rotation speed of the stirrer, without necessarily having to vary the thermal power delivered through the exchanger 6.

The fact that the product is pasteurized while it is in motion, thanks to the rotation of the stirrer 4, prevents the product from burning or sticking to the walls of the first container 2: that way, the quality of the end product is improved.

What is claimed is:

1. A machine for pasteurizing liquid or semi-liquid food products, comprising:

a substantially cylindrical first container configured for thermal treatment of a liquid or semi-liquid base product;

a second container connected to and configured for containing and feeding the liquid or semi-liquid base product to the first container;

a first stirrer mounted inside the first container and configured for mixing the liquid or semi-liquid base product in the first container;

a thermal system comprising a first exchanger thermally connected to a wall of the first container and configured to release heat to the first container;

the first stirrer including:
a first, inlet end and a second, outlet end and extending between the first, inlet end and the second, outlet end;
a first portion disposed at the second, outlet end that is externally continuously helically shaped and arranged within the substantially cylindrical first container to form an enclosed first helicoidal chamber between the first portion and the substantially cylindrical first container such that, as the first stirrer rotates, the liquid or semi-liquid base product is made to advance through the first helicoidal chamber along a direction of extension of the first container between the first, inlet end and the second, outlet end;
a second portion having at least one radial blade, the second portion being disposed at the first, inlet end;
the first portion configured to push the liquid or semi-liquid base product along the direction of extension of the first container while the second portion is configured to stir the liquid or semi-liquid base product;

a recirculation duct connected to the first container and configured to receive the liquid or semi-liquid base product from the second, outlet end and recirculate the liquid or semi-liquid base product back to the first, inlet end;

a substantially cylindrical third container configured for thermal treatment of a liquid or semi-liquid base product;

the thermal system further comprising a second exchanger thermally connected to a wall of the third container for the thermal treatment of the liquid or semi-liquid base product inside the third container; and a second stirrer mounted inside the third container and configured to mix the liquid or semi-liquid base product in the third container, the second stirrer having a portion being externally continuously helically shaped and arranged within the substantially cylindrical third container to form an enclosed second helicoidal chamber between the externally helically shaped portion and the substantially cylindrical third container, the second stirrer having a third, inlet end and a fourth, outlet end and extending between the third, inlet end and the fourth, outlet end, so that as the second stirrer rotates, the liquid or semi-liquid base product is made to advance through the second helicoidal chamber between the third, inlet end and the fourth, outlet end;

wherein the second exchanger is configured to cool the liquid or semi-liquid base product inside the third container;

wherein the second outlet end of the first container is connected to the third inlet end of the third container such that the liquid or semi-liquid base product that has been thermally treated in the first container exits the first container and is conveyed directly to the third container;

wherein the second container is connected to the first container and to the third container;

a valve assembly connected between the second container and the first container and between the second container and the third container and configured to provide selective fluid connection from the second container into the first container and from the second container into the third container.

2. The machine according to claim 1, wherein the second container is an open-top tub.

3. The machine according to claim 1, and further comprising a drive and control unit connected to the thermal system and configured to control the thermal system to heat the wall of the first container to a temperature between 50° and 85° C.

4. The machine according to claim 1, and further comprising a drive and control unit connected to the thermal system and configured to control the thermal system to heat the wall of the first container to a temperature between 60° and 85° C.

5. The machine according to claim 1, and further comprising a drive and control unit connected to the thermal system and configured to control the thermal system to heat the wall of the first container to a temperature between 60° and 75° C.

6. The machine according to claim 1, wherein the thermal system is switchable between a first, heating configuration, in which heat is transferred through the first exchanger to the first container, and a second, cooling configuration, in which the first container is cooled through the first exchanger.

7. A method for pasteurizing liquid or semi-liquid food products in a machine, comprising the following steps:
providing a machine comprising:
a substantially cylindrical first container configured for thermal treatment of a liquid or semi-liquid base product;
a second container connected to and configured for containing and feeding the liquid or semi-liquid base product to the first container;
a first stirrer mounted inside the first container and configured for mixing the liquid or semi-liquid base product in the first container;
a thermal system comprising a first exchanger thermally connected to a wall of the first container and configured to release heat to the first container;
the first stirrer including:
a first, inlet end and a second, outlet end and extending between the first, inlet end and the second, outlet end;
a first portion disposed at the second, outlet end that is externally continuously helically shaped and arranged within the substantially cylindrical first container to form an enclosed first helicoidal chamber between the first portion and the substantially cylindrical first container such that, as the first stirrer rotates, the liquid or semi-liquid base product is made to advance through the first helicoidal chamber along a direction of extension of the first container between the first, inlet end and the second, outlet end;
a second portion having at least one radial blade, the second portion being disposed at the first, inlet end;
the first portion configured to push the liquid or semi-liquid base product along the direction of extension of the first container while the second portion is configured to stir the liquid or semi-liquid base product;
a recirculation duct connected to the first container and configured to receive the liquid or semi-liquid base product from the second, outlet end and recirculate the liquid or semi-liquid base product back to the first, inlet end;
a substantially cylindrical third container configured for thermal treatment of a liquid or semi-liquid base product;
the thermal system further comprising a second exchanger thermally connected to a wall of the third container for the thermal treatment of the liquid or semi-liquid base product inside the third container; and
a second stirrer mounted inside the third container and configured to mix the liquid or semi-liquid base product in the third container, the second stirrer having a portion being externally continuously helically shaped and arranged within the substantially cylindrical third container to form an enclosed second helicoidal chamber between the externally helically shaped portion and the substantially cylindrical third container, the second stirrer having a third, inlet end and a fourth, outlet end and extending between the third, inlet end and the fourth, outlet end, so that as the second stirrer rotates, the liquid or semi-liquid base product is made to advance through the second helicoidal chamber between the third, inlet end and the fourth, outlet end;
wherein the second exchanger is configured to cool the liquid or semi-liquid base product inside the third container;
wherein the second outlet end of the first container is connected to the third inlet end of the third container such that the liquid or semi-liquid base product that has been thermally treated in the first container exits the first container and is conveyed directly to the third container;
wherein the second container is connected to the first container and to the third container;
a valve assembly connected between the second container and the first container and between the second container and the third container and configured to provide selective fluid connection from the second container into the first container and from the second container into the third container;
continuously feeding the liquid or semi-liquid base product from the second container to the first container;
pasteurizing the liquid or semi-liquid base product through the steps of heating the wall of the first container to a temperature between 50° and 85° C. and simultaneously making the first stirrer rotate to cause the liquid or semi-liquid base product to advance continuously from the first, inlet end to the second, outlet end of the first stirrer.

8. The method according to claim 7, wherein the step of heating the wall of the first container to the temperature between 50° and 85° C. comprises a step of heating the wall of the first container to a temperature between 60° and 85° C.

9. The method according to claim 7, wherein the step of heating the wall of the first container to the temperature between 50° and 85° C. comprises a step of heating the wall of the first container to a temperature between 60° and 75° C.

\* \* \* \* \*